(12) United States Patent
Henschke et al.

(10) Patent No.: US 7,327,769 B2
(45) Date of Patent: Feb. 5, 2008

(54) INJECTION LOCKING Q-SWITCHED AND Q-SWITCHED CAVITY DUMPED $CO_2$ LASERS FOR EXTREME UV GENERATION

(75) Inventors: Robert Henschke, East Hampton, CT (US); Joel Fontanella, Tolland, CT (US); Anthony J. DeMaria, West Hartford, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/542,466

(22) Filed: Oct. 3, 2006

(65) Prior Publication Data

US 2007/0091973 A1  Apr. 26, 2007

Related U.S. Application Data (60) Provisional application No. 60/727,656, filed on Oct. 18, 2005.

(51) Int. Cl.
*H01S 3/10* (2006.01)
*H01S 3/13* (2006.01)

(52) U.S. Cl. ............ 372/25; 372/28; 372/29.022; 372/30

(58) Field of Classification Search ........... 372/25, 372/28, 29.022, 30
See application file for complete search history.

(56) References Cited

U.S. PATENT DOCUMENTS 6,697,408 B2  2/2004  Kennedy et al. ......... 372/55

6,784,399 B2  8/2004  Dunsky et al. ......... 219/121.68
2005/0157762 A1  7/2005  DeMaria et al. ......... 372/9

FOREIGN PATENT DOCUMENTS

JP  5-121816  5/1993

OTHER PUBLICATIONS

H. Houtman et al., "Ultrashort $CO_2$ laser pulse generation by square-wave mode locking and cavity dumping," *Optics Letters*, vol. 12, No. 2, Feb. 1987, pp. 87-89.
K. Choi et al., A Q-switched alexandrite laser injection seeded by a rubidium absorption frequency matched diode laser, *Optics Communications*, vol. 88, No. 4,5,6, Apr. 1, 1992, pp. 385-390.

*Primary Examiner*—Armando Rodriguez
(74) *Attorney, Agent, or Firm*—Stallman & Pollock LLP (57) ABSTRACT

A $CO_2$ laser reference oscillator (RO) can provide injection seeding to a Q-switched (QS) or Q-switched cavity dumped (QSCD) $CO_2$ laser, where the output frequency of the RO laser is locked to the peak of the laser line by the use of appropriate electronics to dither one of the resonator mirrors of the reference oscillator. This injected radiation seeds the radiation building up within the Q-switched laser cavity, such that the oscillating frequency favors the wavelength of the injected radiation. An electronic feedback control circuit can be used to lock an axial mode of the Q-switched laser to line center. The change in build-up time of the pulses within the QS laser can be used to maintain cavity length at a value that enables oscillating at the peak of the same laser line that is injected into QS laser.

19 Claims, 7 Drawing Sheets

FIG. 8

INJECTION LOCKING Q-SWITCHED AND Q-SWITCHED CAVITY DUMPED CO$_2$ LASERS FOR EXTREME UV GENERATION

PRIORITY

This application claims priority to U.S. Provisional Patent Application Ser. No. 60/727,656 filed Oct. 18, 2005, which is incorporated herein by reference.

BACKGROUND

Suppliers of photolithographic equipment for the semiconductor industry are actively performing research and development programs directed toward the use of Q-switched (QS) or Q-switched cavity dumped (QSCD) CO$_2$ laser oscillator/amplifier systems for use as the optical pump source in the generation of extreme ultra-violet (EUV) radiation via plasma generation. This course of action has been selected because these lasers have a high peak power output, such as equal to or greater than 1 KW for Q-switched (QS) lasers and about 10 KW for Q-Switched Cavity Dump (QSCD) lasers. These lasers have short pulse durations, such as 0.1 to 2 microseconds for QS lasers and 10 to 30 ns for QSCD lasers. These lasers also have reasonable oscillator output average powers, such as on the order of about 20 to 50 W, in single mode operation, and have high pulse repetition rates, such as $\geq 100$ KHz. These lasers can run in single mode operation, and can have a relatively lower cost than solid state laser sources. Output powers exceeding 35 KW have been obtained with gas flowing CO$_2$ lasers which are suitable for high power amplifier applications.

Another application for QS and QSCD CO$_2$ lasers is in remote sensing systems using coherent laser radar (LADAR) technology, where range and Doppler information are of interest.

Present CO$_2$ QS and QSCD lasers have variations in pulse peak power with time, and considerable turn-on time jitter from pulse to pulse. The pulse amplitude and turn-on time jitter variations occur primarily due to statistics associated with the laser pulses building up from noise, from the drifting of the axial modes of the resonator across the oscillating CO$_2$ gain curve with temperature, as well as from variations in the discharge. These problems are common to solid state lasers as well. Switching the laser wavelength from pulse to pulse to the next highest gain line amongst the numerous rotational lines of the CO$_2$ molecule during the Q-switching process is also common in QS or QSCD CO$_2$ lasers. This line switching is primarily believed to be caused by the drifting of the axial modes of the laser resonator, with temperature and discharge variations, across the vibrational/rotational lines of the CO$_2$ molecules. During laser operation, these lines have varying amounts of inverted population (i.e. gain). This frequency switching from pulse to pulse also contributes to the peak pulse power fluctuations, pulse to pulse time jitter, and changes in pulse width of present QS and QSCD CO$_2$ lasers. These pulse to pulse variations present in existing systems can result in system performance variations in the amount of deep ultra-violet generation for photolithography applications, the maximum detectable range of laser radars systems, and the accuracy of the velocity of a target that can be measured with heterodyned CO$_2$ laser radar systems. Such variations in system performance are not acceptable.

SUMMARY OF THE INVENTION

In order to address these drawbacks, the subject invention is specifically directed to high power, high repetition rate, Q-switched or Q-switched, cavity dumped lasers with an output is the vary stable on a pulse to pulse basis. To achieve this goal, a lower power, CW reference oscillator is provided which is configured to generate a stable frequency output beam for seeding the Q-switched laser. In the preferred embodiment, the reference oscillator includes a grating for wavelength selection and a feedback loop for locking the frequency of the output beam.

The beam from the reference oscillator is directed into the cavity of the Q-switched laser. This beam will seed the output of the Q-switched laser. The Q-switched laser also includes a feedback circuit which monitors the Q-switched output beam and sends a control signal to a PZT connected to one of the resonator mirrors for controlling the length of the resonant cavity. In one preferred embodiment, the PZT is dithered and the feedback circuit monitors the laser for peak power.

In a more stable embodiment, the feedback circuit includes a cavity build up time (CBUT) sensing circuit. This circuit monitors the time it takes to build up laser oscillation in the cavity to a predetermined level. The shortest time period will correspond to the peak of the laser's gain curve where the gain is highest. To the extent that a given output pulse is not at line center, its rise time will be slower then the ideal pulse, causing the time sensing circuit to output a control signal which is used to drive the resonator mirror in a direction closer to the optimum position for lasing at line center. In the preferred embodiment, the feedback circuit includes a hill climbing servo and a low frequency electronic dither oscillator to control the PZT.

Further objects and advantages will become apparent from the following detailed description taken in conjunction with the drawings in which:

DETAILED DESCRIPTION

Systems and methods in accordance with embodiments of the present invention can overcome these and other deficiencies in existing laser systems. Although the embodiments herein will be described with respect to $CO_2$ laser systems, it should be understood that advantages and teachings included herein can be applied equally as well to other QS and/or QSCD lasers, such as solid state lasers.

Systems in accordance with various embodiments can utilize a $CO_2$ laser reference oscillator (RO) that uses one of a number of well known techniques to lock the output of the RO laser frequency to the peak of the laser line. This locking can be done in one embodiment through the use of appropriate electronics to drive a PZT transducer on which one of the laser mirrors is mounted. The laser line of the RO can be selected by an intercavity optical grating or by using wavelength selective thin film coatings on the resonator mirrors. A grating is particularly desirable if the wavelength to be selected is close to the highest gain line (10.6 microns).

The output radiation from the RO is injected into a QS or QSCD $CO_2$ laser. In this specification, the QS or QSCD laser is sometimes referred to as the transmitter. This injected radiation can seed the radiation building up within the transmitter cavity, so as to favor the oscillating frequency of the transmitter to be the same as the frequency of the wavelength-selected and frequency-stabilized RO. In addition, this injected radiation can greatly reduce the pulse-to-pulse jitter that can arise when a pulse is allowed to build up out of noise. An electronic feedback control circuit can be used to also lock one of the axial modes of the transmitter cavity to line center which will correspond to the injected frequency from the RO. An electronic circuit can be used that provides a discriminant signal, which can use the build-up time delay of the laser pulses as described below. This new circuit also can find use in QS or QSCD solid state lasers.

When the laser cavity is tuned to line center, the gain of the transmitter can be at the highest value, whereby the cavity buildup time of the pulse is the shortest. If the laser cavity is not tuned to line center, the gain can be lower and the cavity build-up time longer. This change in build-up time of the pulses within the QS or the QSCD transmitter can be used to provide a signal to a hill climbing feedback circuit that maintains the transmitter cavity length at a value that enables it to oscillate at the peak of the same laser line that is injected into the transmitter cavity by the RO. Injection from a continuous wave (cw) frequency-stable RO into a QS or QSCD laser transmitter laser is well known in the art, but actively frequency locking an axial mode of a QS or QSCD transmitter to line center during the injection process does not appear to have been previously reported. The use of injection from a RO for the purpose of reducing the pulse to pulse jitter in QS or QSCD lasers over the jitter experienced when the laser oscillator builds up from noise also can be important, as is the use of the cavity build-up time information as a discriminant signal in a hill climbing feedback circuit and how the circuit is implemented.

Due to their pulsating nature, the use of QS or QSCD features in a transmitter can add a degree of complexity to the frequency control architecture of the transmitter. The physics of the QS or QSCD process (i.e., a pulsating signal exists instead of a cw signal) can reduce the effectiveness of a hill-climbing servo circuit approach commonly used to frequency lock the output of CW lasers to line center. The high gain conditions that exist in QS or QSCD lasers also can give rise to strong effects on the output behavior of these lasers. These effects can be caused by multiple etalon resonances that normally are not a consideration in lower gain lasers, or in lasers that do not have additional optical and/or electro-optical components inserted within the feedback cavity of the laser. These etalon resonance effects can be particularly strong in QS or QSCD lasers that have a large gain resulting from the physics of the QS or QSCD process. The need for a long gain region to obtain high peak powers pulses can further increase the gain, compounding the difficulty associated with these etalon effects. These effects can be more common when the optical resonator has multiple folded gain regions (i.e., folded gain channels either in wave guide or in folded free space confined Gaussian mode laser configurations). Folding techniques can be used to shorten the length of the laser housing to an acceptable dimension. The folding mirrors can couple stray radiation scattered from the mirrors back into the laser feedback cavity, which can cause etalon problems under high laser gain conditions.

Additional resonances within the laser cavity caused by these etalons can increase the difficulty in obtaining a monotonic amplitude discriminant signal that normally is needed to lock the oscillation of the transmitter at line center by the use of an electronic feedback circuit, particularly where no signal is injected into the transmitter. The monotonic amplitude discriminant signal approach can use the well known concept of dithering a transducer (such as a PZT) that provides a horizontal periodic piston motion drive to one of the laser feedback mirrors. The amplitude of this AC dithered signal can be minimized using the hill climbing feedback circuit by also super-imposing on the dithering frequency a slowly varying signal. The super-imposed signal can help to move the dithering mirror and thus one of the laser cavities axial mode to line center. If spurious optical resonances occur in addition to the fundamental resonances of the axial mode of the resonator due to etalon effects, a discriminant signal that depends on an amplitude variation of the laser output as a function of a differing/translating laser resonator mirror may not be reliably used to obtain firm frequency locking of the laser output radiation to the frequency of the radiation injected from the RO laser.

The existence of these etalon resonances can "confuse" the hill climbing feedback circuit. To prevent this confusion problem in high gain laser operation, a discriminant signal can be used that is based on minimizing the build-up time variations between the time a voltage signal is applied to the EO crystal to turn on the QS transmitter and the actual time the QS or QSCD pulses begin to oscillate. The dithering mirror can be used to cause a slight periodic time variation in the build-up time variation between pulses. The phase of this periodic time variation, relative to the dither signal, can change 180 degrees as the cavity frequency is changed from above to below the RO frequency. A cavity build-up time (CBUT) feedback electronic circuit can detect this low frequency AC signal and provide a signal to the hill climbing circuit that, in turn, provides a signal to the transducer to translate the resonator mirror. The resonator mirror can be translated so as to position the oscillating output frequency of the transmitter to line center, where the AC signal and the build-up time delay are both minimized. The minimum build up time delay can occur at the frequency corresponding to the peak of the transmitter gain curve, where the gain is highest, and which also coincides with the frequency of the injected signal from the RO.

For QS or QSCD lasers that have an injected signal and sufficiently lower gains, such that the etalon effects do not present a significant problem, the transmitter can use the same hill climber electronic feedback approach used in the CW operating RO to position and maintain an axial mode of the resonator of the laser at the peak of the gain curve. This approach may be less robust than the CBUT circuit approach, but can have the advantage of lower cost because a slower detector can be used and there is no CBUT circuit. Consequently, this approach can have merits where capital cost is a determining factor.

From pulse to pulse in QS or QSCD lasers, the laser often oscillates on different rotational lines. These different lines can have different gains that result in pulse to pulse amplitude, rise time, pulse width, and pulse jitter variations in addition to output frequency variations. If one inserts an optical grating into the QS or QSCD laser to force the laser to oscillate on the same rotational line, the laser can experience lower laser reliability due to the lower optical damage threshold of the optical grating in comparison with the other optical components within the cavity (due to the high optical flux existing within QS or QSCD laser resonators). The laser transmitter also can experience lower power output due to the higher optical loss presented by the optical grating in comparison with the other optical components inserted within the cavity.

One embodiment addresses these lower reliability and higher optical loss problems presented by inserting a grating within the feedback cavity of a low power RO laser instead of the high power transmitter. The output of the frequency-stabilized RO laser then can be injected into the QS or QSCD transmitting laser. Since the RO is a low power laser, efficiency is not of paramount importance. The fact that the RO is lower power than the transmitter also can help to avoid optical damage to the grating.

The maximum deviation of the relative peak amplitude of QS pulses from a ~250 cm long wave guide laser (such as the QS laser described in U.S. Pat. No. 6,784,399, issued on Aug. 31, 2004, which is hereby incorporated by reference) is about +/−9.7%. In the same laser, the maximum deviation for the pulse width at half maximum was found to be +/−2.3%. With the use of wavelength selective coatings on the mirrors in the laser of U.S. Pat. No. 6,284,399 to favor the 9R24 transition (having an output wavelength around 9.3 microns selected for higher absorption in plastic materials), the 9R24 transition was the strongest. However, oscillations from lines 9R20, 2R18, and 9R22 were also present. For EUV and LADAR applications, such frequency hopping performance generally is not acceptable and corrections may be needed.

The five pass QS $CO_2$ laser of U.S. Pat. No. 6,784,399, or U.S. Pat. No. 6,697,408, hereby incorporated herein by reference, can be characterized by oscillations at multi-longitudinal modes. Multi-longitudinal mode operation is possible because the gain medium is not perfectly homogeneously broadened within a specific rotational transition, and because coupling of the rotational upper level manifold through a specific rotational transition has a finite time constant. In addition, as pointed out above, many $CO_2$ vibrational/rotational lines are well above threshold under Q-switching operation. While the pulse width, amplitude, frequency, and pulse-to-pulse time jitter are acceptable for most present material processing applications, they may not be acceptable for heterodyne laser radar systems or for most EUV radiation generation applications. These QS and QSCD laser pulse variations can increase as the gain (i.e. length) of the laser increases to obtain higher peak power/energy pulses. For completeness, the line width of the $CO_2$ gain line at a pressure of 60 to 70 Torr in one embodiment is approximately 300 MHz and the homogenous line width is approximately 70 MHz.

Figure 1:
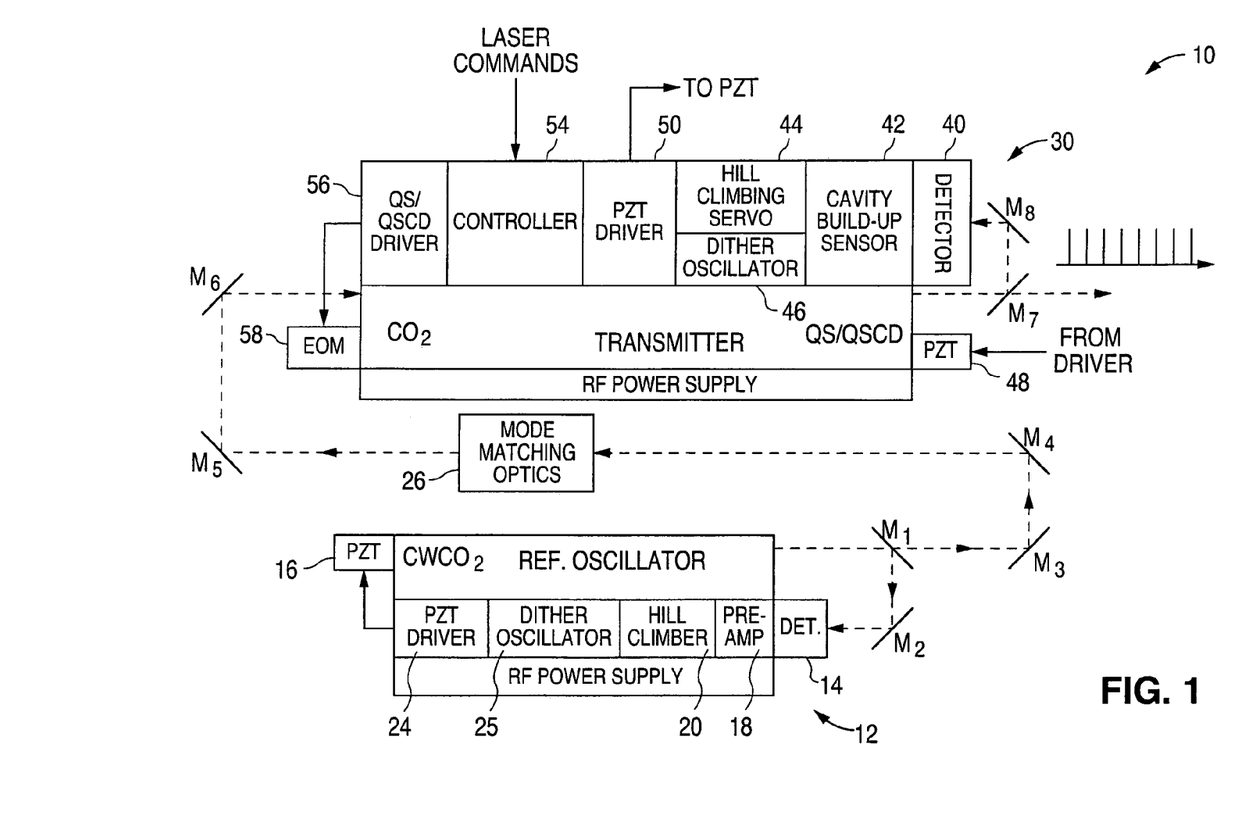
FIG. 1 is a schematic diagram of one embodiment of a Q-switched laser which is injection locked with the output of a reference oscillator made in accordance with the subject invention.

FIG. 1 is a system block diagram of a QS or QSCD $CO_2$ laser 10 in accordance with one embodiment. The same diagram can be applied to laser systems other than the $CO_2$ laser discussed herein. This exemplary laser utilizes a CW RF excited $CO_2$ reference oscillator (RO) 12. Mirrors $M_1$ and $M_2$ each redirect a small portion of the RO output to a slow detector 14. The frequency response of the slow detector can be sufficient to detect variation in laser amplitude caused by the low frequency dithering of the resonator mirror via the PZT 16. This dither frequency is usually around 100 Hz to 1.1 kHz in this embodiment.

The output of the detector 14 can be fed to a pre-amplifier 18, which in turn can provide a control signal to the hill climbing (HC) feedback electronic circuit 20. Such a circuit is shown and described, for example, in FIGS. 9-11 of U.S. Patent Publication No. 2005/0157762, which is hereby incorporated herein by reference. The HC circuit can be used to provide a slowly varying signal to an electronic driver circuit 24. This signal can translate the dithering transducer 16 until the discriminant AC frequency signal on the laser beam, picked up by the detector 14, is minimized. This minimized AC frequency signal can occur when the laser is oscillating at line center, where the slope of the gain curve is the smallest. As part of the hill climbing feedback circuit, a lock-in amplifier can be used to enhance the signal-to-noise ratio of the AC signal as known in the art. In the preferred embodiment, the PZT driver 24 is also provided with dithering signal from dither oscillator 25.

Mirrors $M_3$, $M_4$, $M_5$ and $M_6$ can redirect the output beam of the RO through a mode matching optics (MMO) arrangement 26. MMO arrangement 26 can be used for the efficient coupling of the RO radiation into the cavity of the higher average power QS or QSCD $CO_2$ laser transmitter 30. The QS and QSCD operation of a $CO_2$ laser is described in U.S. Pat. No. 6,697,408, incorporated by reference above, and will not be discussed further herein. A very small portion (i.e., 1% or less) of the output of the QS or QSCD laser can be redirected by mirrors $M_7$ and $M_8$ to a fast detector 40, the output of which is fed to the cavity build-up time (CBUT) electronic circuit sensor 42. The fast detector frequency response can be sufficient to follow the rise time of the QS pulses. The CBUT sensor 42 can feed a signal to the HC servo 44, which in turn can move the dithering transducer on one of the mirrors of the QS or QSCD laser transmitter cavity until an axial mode is placed at line center. The PZT transducer 48 can be driven by the signals provided from the CBUT sensor to the HC servo circuit (including dither oscillator 46), and then to the PZT driver 50, for positioning an axial mode of the transmitter cavity onto the peak of the laser line where the maximum laser gain occurs, as well as where the fastest rise time laser pulse detected by the CBUT occurs. The CBUT discriminant signal here is not dependent on the amplitude of the QS or QSCD pulses.

The operator of the QS or QSCD system can issue digital signal commands to a controller 54, which in turn can provide signals to the high voltage driver 56 of the laser, which can turn on and off the electro-optical modulator 58. Through use of these techniques, the QS or QSCD pulse train of the transmitter propagated through $M_7$ can have the frequency stability of the RO (i.e. $\leq 0.5$ MHz), and can have much improved (uniform) pulse amplitude, pulse widths, and low pulse start-up time jitter typically required by LADAR or plasma generated EUV radiation systems.

Figure 2:
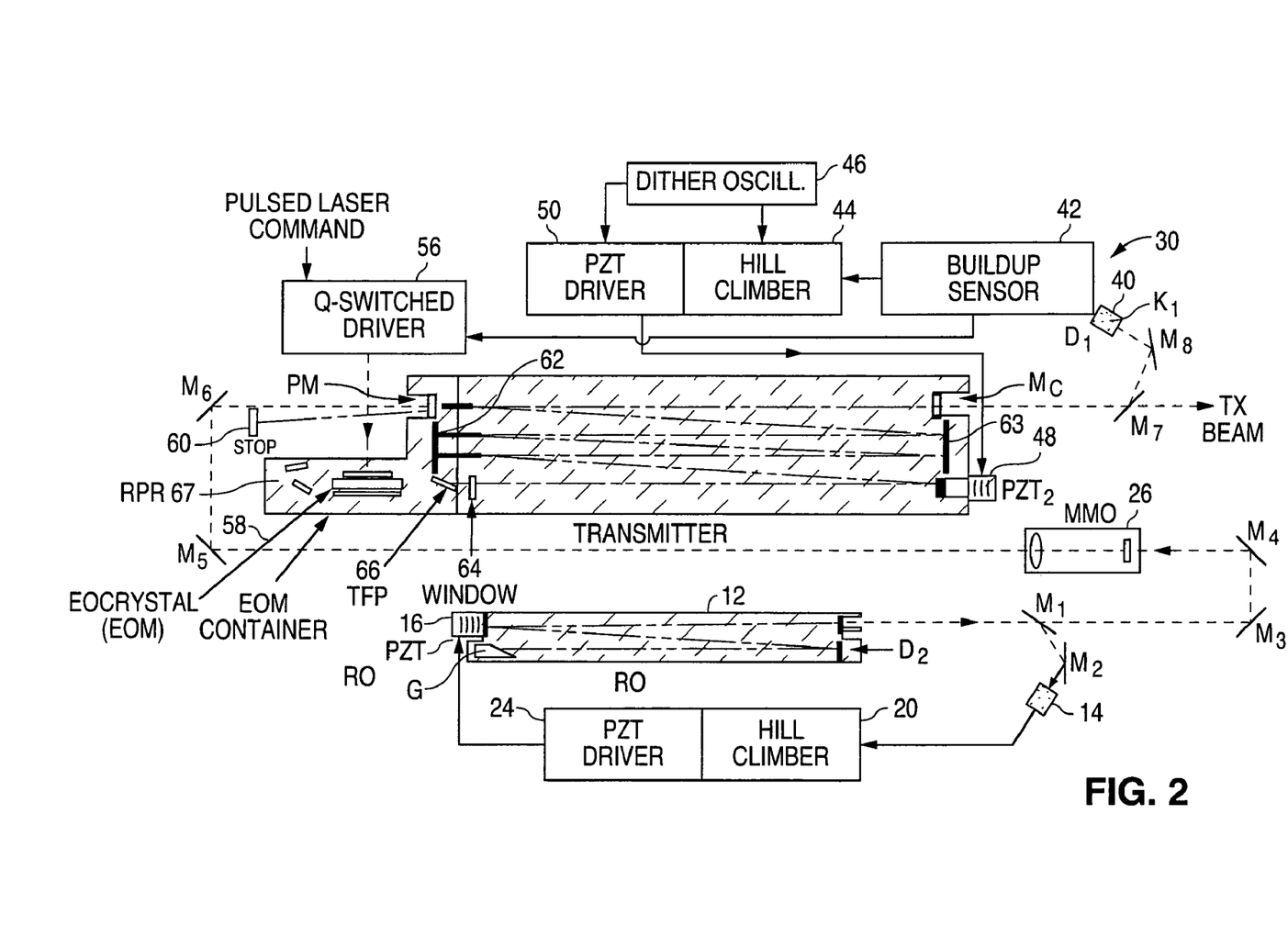
FIG. 2 is a schematic diagram of the laser system of FIG. 1 with additional details.

A more detailed diagram of an RO and the associated QS or QSCD laser housing in one embodiment is shown in FIG. 2 where like reference numerals are used for like parts. This RO 12 is a low power $CO_2$ laser with an internal grating (G)

for selecting the output wavelength of the laser. Since the RO is a low power laser, the efficiency is not of significant consideration. A three-folded waveguide configuration is illustrated, such as the GEM-30 air cooled, sealed off model available from Coherent Inc. of Santa Clara, Calif. A one pass or two pass configuration also can be acceptable. While a waveguide $CO_2$ laser is shown, a free space Gaussian mode optical resonator or similar device also can be used. The output of the RO 12 can be passed through mode matching optics (MMO) 26 to maximize the mode coupling from the RO into the QS or the QSCD transmitter.

In the embodiment of FIG. 2, the injected radiation from the RO into the laser transmitter 30 is shown, as an example, to occur into the top of one of the three wave guide channels positioned at an angle with respect to the output coupling mirror (MC). The injection is done through a slightly transmissive thin-film coated ZnSe mirror (PM) with approximately 99% reflectivity (1% transmission). An optical stop 60 shown can be used to absorb the back-reflected radiation from the transmitter. A seven-folded channel wave guide laser is illustrated as an example. A greater or smaller number of folded wave guide channels or folded free space confined Gaussian mode configurations also can be utilized. The QS or QSCD transmitter is shown with two elongated beam folding mirrors 62, 63 to accommodate two reflection "bounces," in order to reduce the number of resonator mirrors requiring alignment. An anti-reflection thin-film coated window 64, such as ZnSe, can be used to separate the EO module container and the rest of the laser housing. This technique can be used to maintain partial vacuum within the laser housing, while allowing laser radiation to pass into and out of the electro-optical module (EOM) container. To keep contaminants out of the EO module, the EO container can be filled with a clean, dry inert gas, such as nitrogen. The EOM can contain an electro-optical crystal 58, such as CdTe, a thin-film polarizer (TFP) 66, and a reflective phase retarder (RPR) 67, such as is described in U.S. Pat. No. 6,697,408, incorporated above.

When the transmitter of FIG. 2 is operated as a QS laser, the output is obtained from the partially reflective ZnSe optical output coupling mirror, $M_c$, as shown. When the transmitter is operated as a QSCD laser, the output can be obtained from the thin-film polarizer with $M_c$ replaced by a total reflecting mirror. The output for the QSCE optional operation is not shown for simplicity purposes. Principles of operation for QS and QSCD lasers are described in U.S. Pat. No. 6,697,408, incorporated above, and will not be discussed further herein. The relatively large number of intercavity optical components contained in the two laser system of FIG. 2, or even in the transmitter alone, can provide one with an appreciation for the abundance of etalon resonance generating opportunities that can arise. These opportunities can interfere with the obtaining of a good amplitude AC discriminant signal as a function of the dithering laser resonator mirror. As the gain of the transmitter increases, the etalon effects can become more difficult to handle and can make it necessary to utilize an approach that does not depend on an amplitude discriminant to maintain the transmitter laser injection locked to the RO laser frequency.

In addition to the aforementioned effects that can give rise to the pulse jitter time problem, the statistics associated with the laser pulse building up from noise can give rise to the largest pulse jitter variation problem. The injected radiation from the RO portion can overcome this large laser pulse jitter problem when the pulse is allowed to build-up out of noise.

Operational Description of a CBUT Sensor

Figures 3A, 3B:
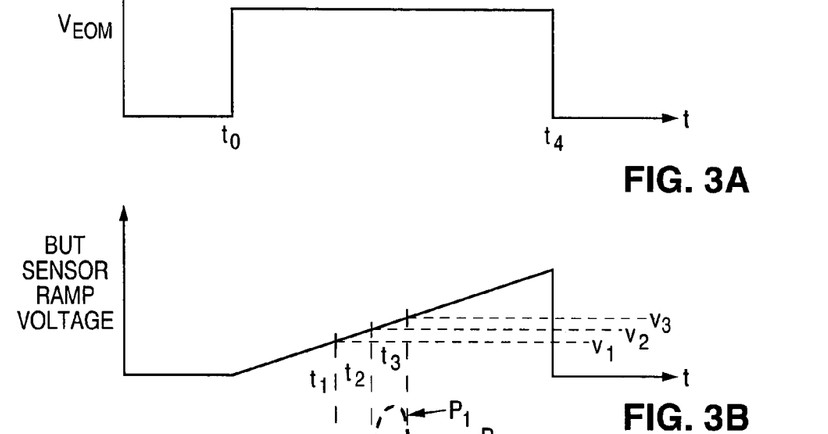
FIGS. 3a-3d are graphs illustrating the operation of the cavity build up time sensing (CBUT) circuit of the subject invention.

FIG. 3 provides a physical explanation of principles of operation for a CBUT circuit in accordance with one embodiment. At some initial time $t_0$, the EOM is commanded to be turned on by the controller, such as the controller of FIG. 1 or 2, and causes a high voltage to appear across the EO crystal (see FIG. 3A), switching the resonator from a high loss to a low loss state. At about the same time, a voltage ramp that is linear with time is generated within the CBUT circuit, such as is shown in FIG. 3B. At time shortly after $t_0$, the Q-switched laser pulse would normally begin to build up out of spontaneous emission (i.e. noise) within the laser cavity. The build-up time of the pulse can be determined primarily by this relatively slow statistical aspect of the amplified spontaneous emission process. To a much lesser extent, this build up time also can be affected by the position of the axial mode that is first to oscillate with respect to the peak of the gain curve. The use of injected radiation from the RO laser can greatly reduce the build-up time jitter because the build-up time is controlled by stimulated emission (i.e., amplification) of the injected radiation instead of out of the much slower amplified spontaneous emission. The injected RO radiation also can provide a forcing function for the transmitter to oscillate at the same frequency as the RO.

Figure 3C:
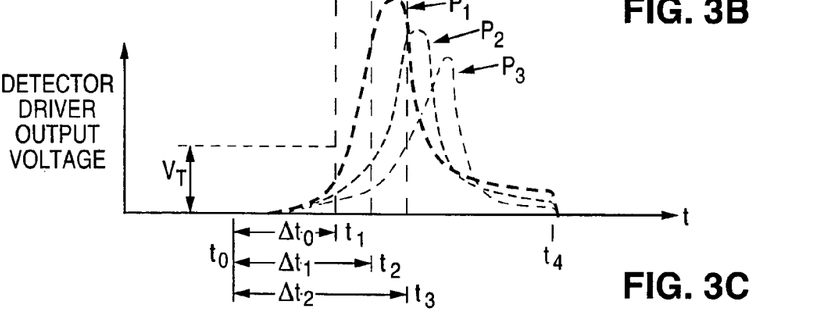

The cavity build up time can be determined predominately by the gain characteristics of the transmitter. A higher gain can result in a faster build-up time (and vice versa). The shortest build-up time can occur when one of the axial resonator modes of the transmitter coincides with the peak of the gain curve (where the gain is highest). In FIG. 3C, this corresponds to pulse $P_1$. Over a reasonable range of injected powers, then, larger injected powers from the RO can result in faster rise times and smaller CBUT jitter.

Figure 3D:
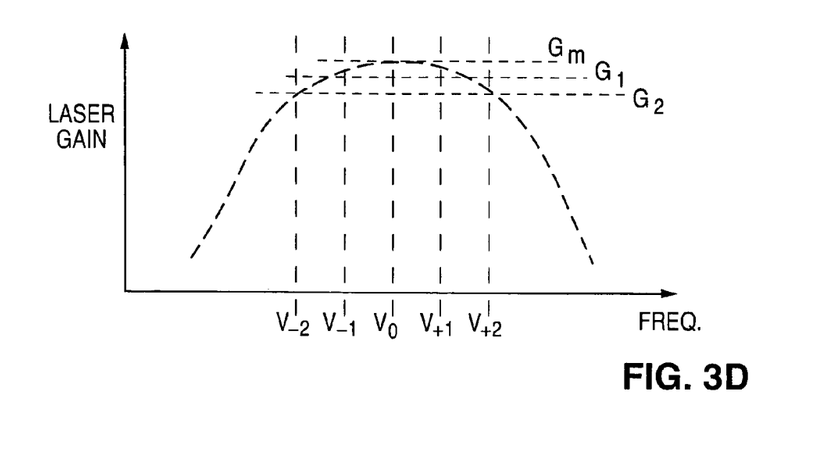

The CBUT circuit also can select a threshold voltage $V_t$ as in FIG. 3C. When the signal from the detector 40 exceeds $V_T$, such as at time $t_1$, a voltage $V_1$ can be obtained from the ramp voltage. However, if the transmitter axial mode is off of line center of the gain curve, one of the pulses $P_2$ or $P_3$ can arise (rather than $P_1$). In this case, the threshold voltage $V_T$ will not be crossed until a later time during the ramp up of current in the CBUT, thus giving rise to increasing voltages $V_2$ and $V_3$, respectively, from the voltage ramp (as shown in FIG. 3B). In this case, the transmitter wants to oscillate at $\upsilon_{\pm 1}$ or $\upsilon_{\pm 2}$ instead of $\upsilon_0$ at the peak of the gain curve, as illustrated in FIG. 3D. For pulses $P_2$ and $P_3$, $V_T$ is reached/exceeded at times $t_2$ and $t_3$, respectively, and voltages $V_2$ and $V_3$ are obtained from the linear ramp voltage. Due to the dithering of the mirror by the dither oscillator, these voltages also can have a small amplitude AC dither frequency with time. This voltage dither can be detected by a lock-in amplifier within the HC circuit to enhance signal-to-noise. As they occur, voltages $V_3$, $V_2$ and $V_1$ can be fed to the hill climbing servo circuit. The HC servo can provide a gradually varying signal, so as to translate the dithering PZT transducer, and its attached mirror, to a position where the input voltage from the CBUT circuit is at a minimum (i.e., to the value $V_1$ in this example). This is a condition for which the CBUT delay, $\Delta t$, is minimized (i.e., at $\Delta t = t_1 - t_0$ in FIG. 3C) or the gain ($G_m$) in FIG. 3D is maximized. There are numerous approaches to electronic implementation for achieving the functions illustrated in FIGS. 3A to 3D that are well known to those skilled in electronic circuitry. Consequently, such details are not discussed herein.

It should be noted that this circuit might take a number of Q-switch cycles before the laser will be driven in a manner to lock the output frequency at the seed frequency. However, as noted above, this circuit is intended to be used in lasers with very high repetition rates (100 KHz or greater) so that frequency locking will occur in a very short time period, and well within any typical warm up time for the laser.

Experimental Data

Figure 4:
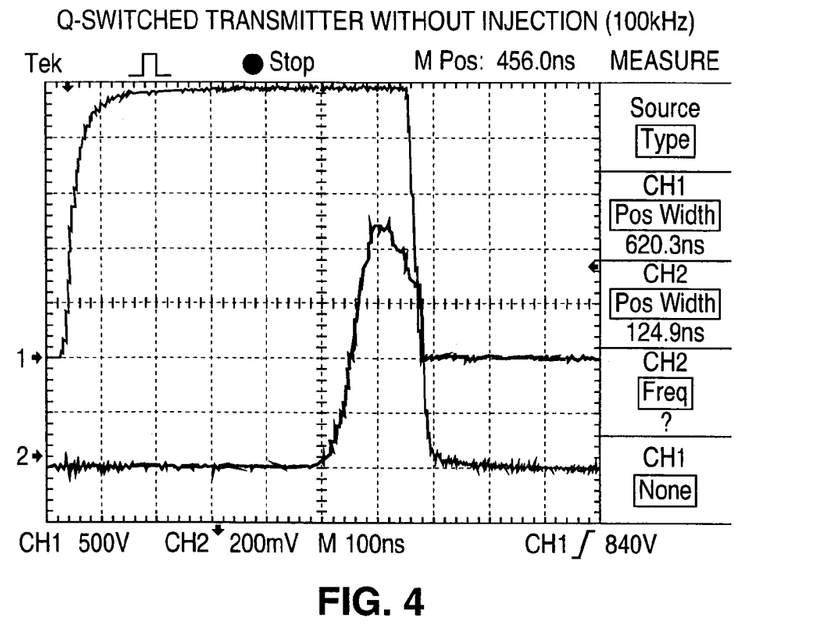
FIG. 4 is a graph illustrating the output of a laser which is not using the subject injection locking technique.

FIG. 4 illustrates an exemplary oscilloscope trace (upper curve) for a ~2400V square wave voltage of approximately 624 nsec duration that can be applied to the EO crystal, such as by the EO driver of the seven-pass transmitting laser described with respect to FIG. 2. Slightly less than 500 nsec later, as can be seen in the lower curve of FIG. 4, the Q-switched pulse from the transmitter builds up out of the spontaneous emission noise, when no radiation from the RO is injected into the transmitter and without the CBUT circuit functioning. For this case, where the high voltage is turned off after about 624 nsec, the back end of the Q-switched pulse can be truncated as shown to yield a 125 nsec wide pulse at the full width, half power points. The pulse could have been narrower or wider, depending on the width of the high voltage pulse.

Figure 5:
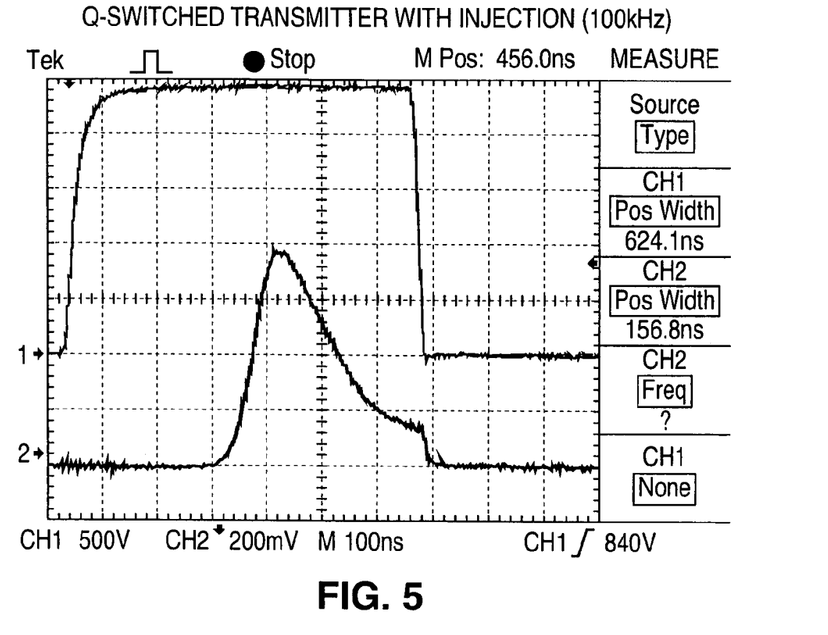
FIG. 5 is a graph similar to FIG. 4 but illustrating the output of a laser which is using the subject injection locking technique.

FIG. 5 again illustrates an exemplary oscilloscope trace for a ~2400V square pulse applied to the EO crystal of the seven pass transmitter, where the voltage duration is again ~624 nsec. With radiation from the RO injected into the transmitter and the CBUT circuit activated, the Q-switched pulse now appears much sooner, at approximately 300 nsec after the activation of the EO crystal. The long tail normally observed in $CO_2$ laser Q-switching operation is truncated (i.e., clipped off) when the voltage to the EO crystal is turned off. This truncated radiation is ejected, or cavity dumped, out of the transmitter cavity by the TFP. This radiation ejection process can be the same process used for QSCD operation of the transmitter. In the QSCD case, the partially reflecting mirror Mc of the QS transmitter shown in FIG. 2 can be replaced by a high reflecting mirror. While not shown in FIGS. 4 and 5, the free-running QS pulse train without injection and CBUT control exhibited a pulse-to-pulse jitter between about 50 and 100 nsec. With injection and CBUT control, the measured jitter was reduced to about 3-10 nsec. This represents an order of magnitude improvement.

Figure 6:
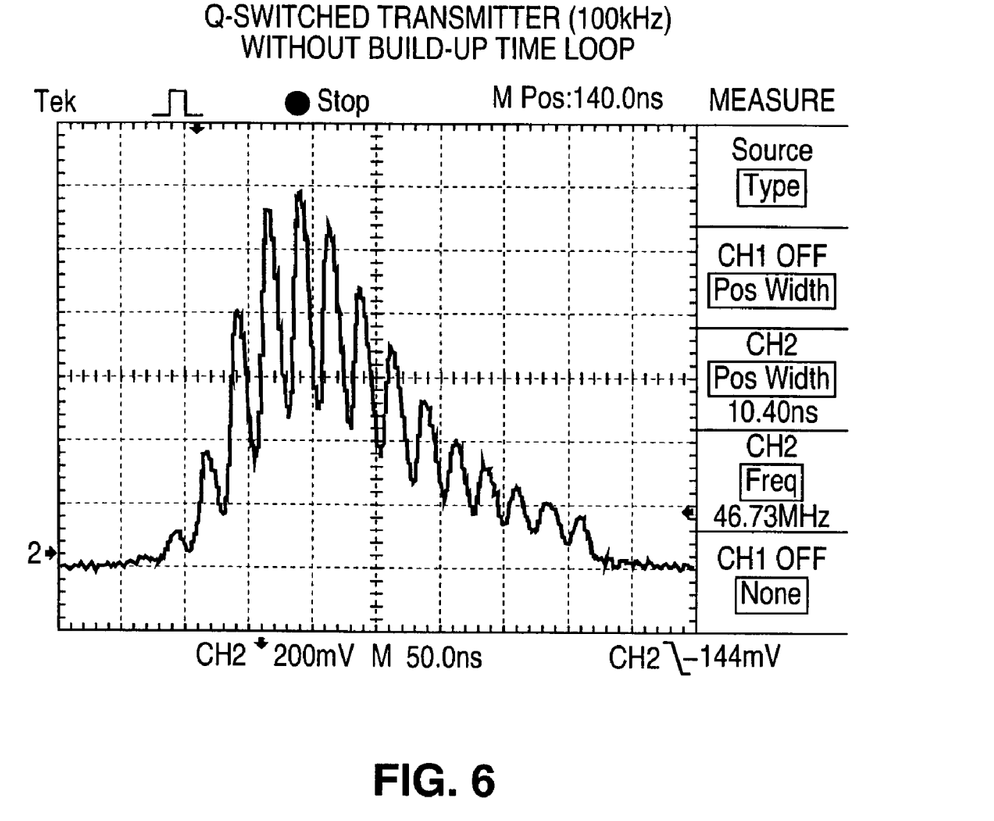
FIG. 6 is a graph illustrating the output of a laser which is not using the subject injection locking technique and showing the existence of multiple longitudinal modes.

The free running QS transmitter can tend to operate on multiple longitudinal modes simultaneously. FIG. 6 illustrates a Q-switched pulse without injection and CBUT control that exhibits oscillation on multiple axial modes. The frequency of the amplitude variation shown in the laser pulse of FIG. 6 is approximately 47 MHz, and corresponds to the beating of two longitudinal modes of the transmitter feedback cavity. With injection and CBUT control, the modulation caused by two oscillating axial modes of the laser cavity shown in the pulse of FIG. 6 is not observed. Furthermore, these desirable characteristics can be retained as the RO was tuned over a range of rotational lines by manually tilting the grating of the RO laser. The tilting of the grating can be engineered to be driven by an electrical signal. This ability to efficiently vary the oscillating rotational line of the Q-switched laser can be valuable for remote sensing, as well as for minimizing atmospheric absorption when $CO_2$ laser radiation is propagated long distances through the atmosphere (as is the case for remote sensing/LADAR applications).

One Dither Oscillator Embodiment

Figure 7:
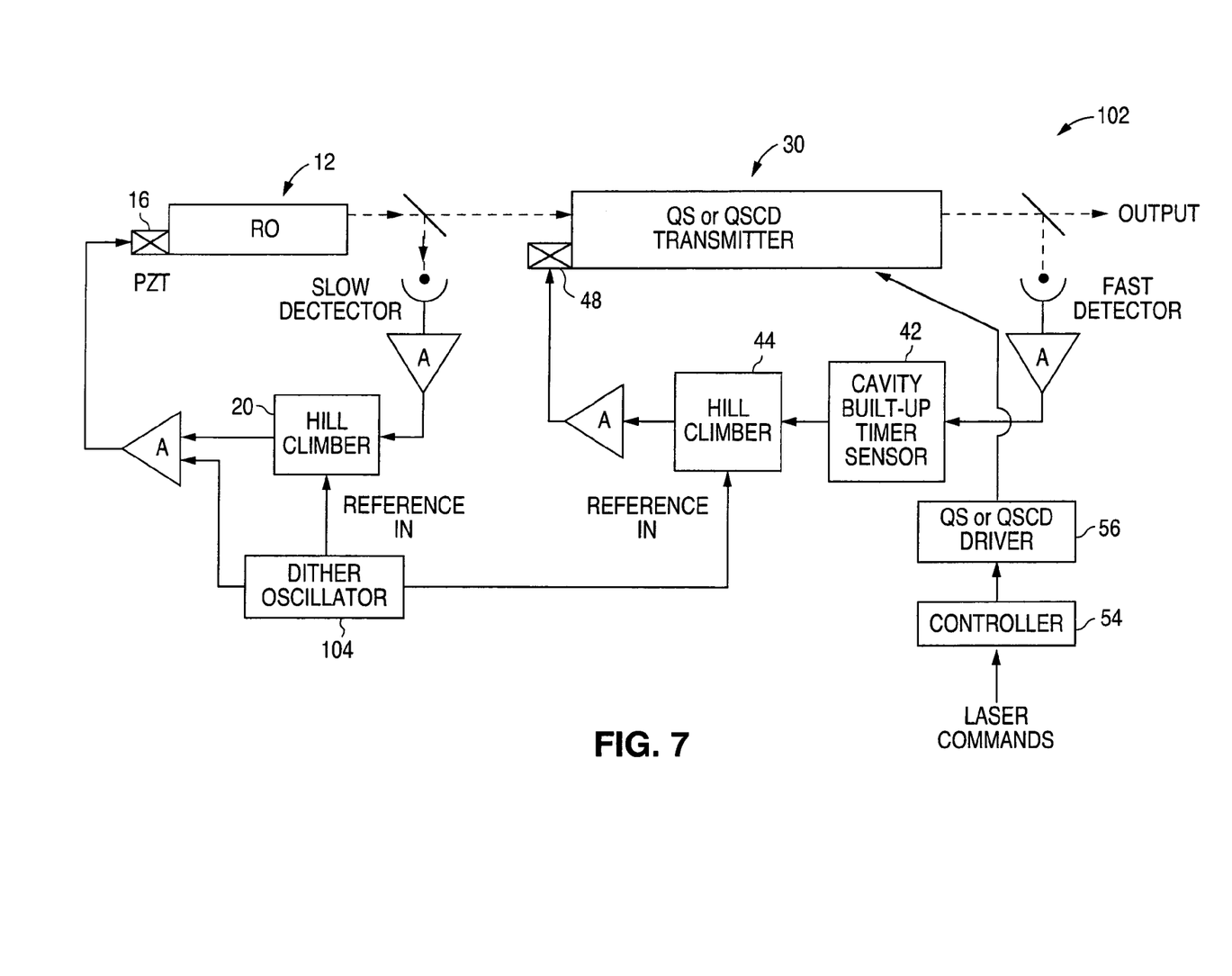
FIG. 7 is a schematic diagram of another embodiment of a Q-switched laser system made accordance with the subject invention which uses a CBUT circuit but only a single dither oscillator.

FIG. 7 illustrates a QS or QSCD system 102 in accordance with another embodiment. This system uses only one dithered mirror oscillator 104, instead of two separate oscillators such as are shown in the system of FIG. 2. The single dithered mirror oscillator can be used on the RO. When only one dithered electronic oscillator is used in the injection laser system, the amount of drive applied to the transducer can be increased so that the excursion of the dither within the RO is increased. The excursion can be increased to the point that the AC discriminant signal it produces is detectable by the CBUT circuit sensor and the hill climbing feedback circuit of the transmitter. An advantage of the system of FIG. 7 is that the use of a single dithered oscillator can reduce cost. A potential disadvantage is the larger laser dithered frequency variation obtained from the oscillator. A larger dithered frequency excursion output from the transmitter can be acceptable to a EUV system, but may not be acceptable by a LADAR system.

Alternative Injection QS or QSCD Laser System

Figure 8:
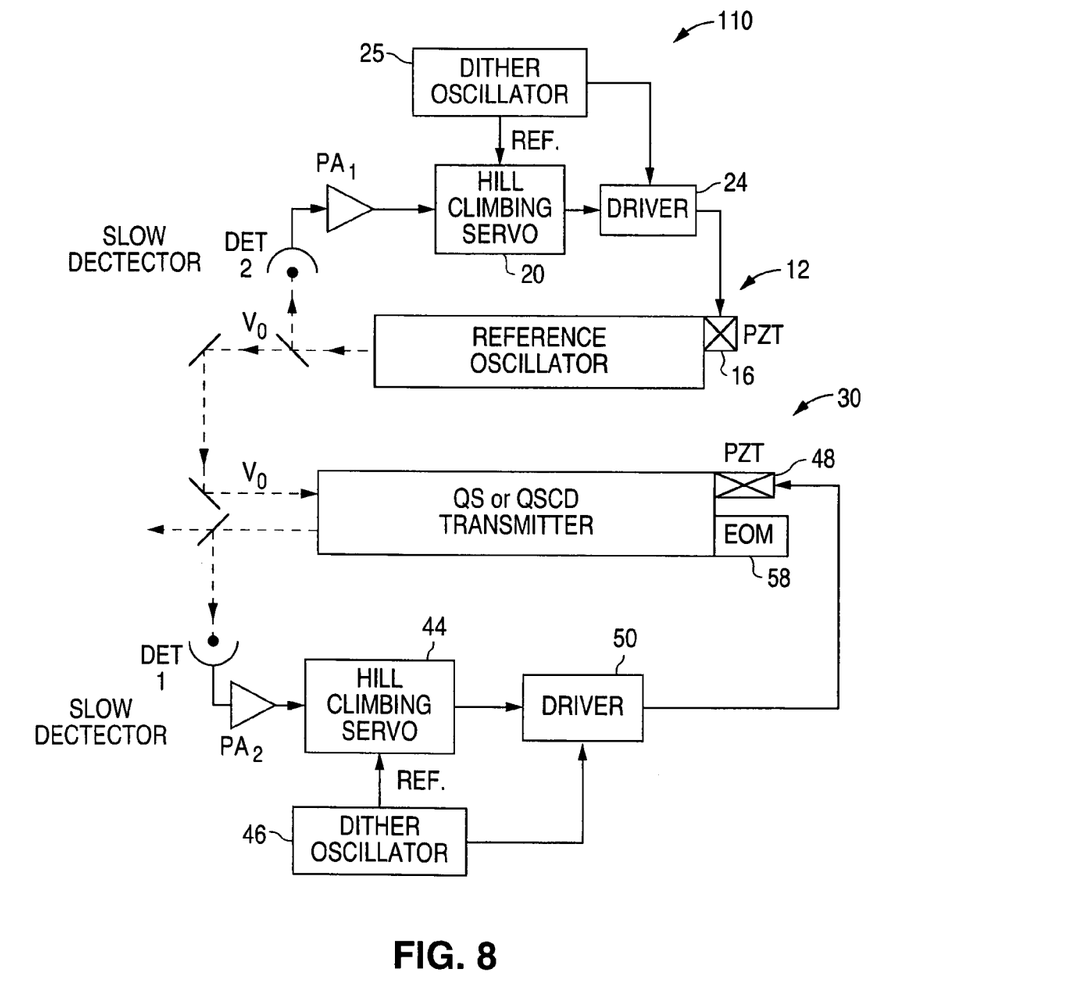
FIG. 8 is a schematic diagram of still another embodiment of a Q-switched laser system made accordance with the subject invention which uses two dither oscillators but does not include a CBUT circuit.

A system 110 in accordance with another embodiment, such as is shown in the block diagram example of FIG. 8, can obtain similar benefits to the CBUT sensor circuit. This system uses only a hill climbing circuit in the transmitter, with no CBUT circuit. Such a system can be applicable with lower gain transmitters, with attention paid to reducing etalon effects from the inter-cavity optical components in an injection locked laser system, and with more power injected into the transmitter. The reference oscillator (RO) 12 in FIG. 8 can be the same as in FIG. 2. The output radiation from the RO can be injected into the QS or QSCD transmitter as discussed above. A lower gain transmitter can be used, with a shorter gain length and fewer folded optical wave guides, such as 3 or 5 instead of 7 or higher. Careful attention can be paid to the reduction of etalon effects. Further, more radiation can be injected or coupled into the transmitter from the RO, such as a few percent instead of the one percent or less used in the system. Using these guidelines, one can come close to the performance of the system of FIG. 2 that uses the CBUT sensor 42 of FIG. 2. For applications that do not require a long gain length, such as applications requiring lower power transmitters, one can get by with dispensing with the CBUT sensor circuit and providing only a hill climbing electronic feedback loop around the transmitter. This can save the cost of a fast detector because a slow IR detector can suffice. It also can save the cost of the CBUT circuit. A potential disadvantage of the system of FIG. 8 is that such a system may not be as robust as the system of FIG. 2. It also can be desirable to have the power of the transmitter as high as possible in order to reduce the amount of laser amplification needed to achieve the desired amount of pulse power on the target. Laser amplifiers typically are less efficient and more costly then oscillators. Amplifiers also typically require costly isolators to prevent self oscillation. One common source of self oscillation, for example, comes from optical feedback from the target back through the amplifiers and into the transmitter/oscillator. Such feedback can seriously damage the transmitter/oscillator if isolators are not used.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

We claim:

1. A laser system comprising:
   a local oscillator generating a reference laser beam at a fixed output frequency;
   a laser including a resonant cavity defined by at least two mirrors and wherein one of the mirrors is coupled to a position controller for adjusting the position of said one mirror to control the length of the cavity, said laser including a Q-switch which is repeatedly activated to change the cavity between a high loss and a low loss state causing pulses of laser radiation to be generated;

optics for directing the reference laser beam into the resonant cavity of the laser;

a detector for monitoring intensity of the pulses generated by the laser; and a control circuit receiving the output from the detector and monitoring the rise time of the laser pulse emitted from the laser after each activation of the Q-switch and generating a control signal supplied to said position controller to drive the mirror to a position which minimizes the rise time of the detected pulses and thereby lock the output frequency of the laser to the frequency of the local oscillator.

2. A laser system as recited in claim 1, wherein said control circuit includes a cavity build up time sensing circuit, said time sensing circuit generating an increasing voltage ramp and a voltage signal output corresponding to a point on the voltage ramp when the intensity of the pulse measured by the detector crosses a predetermined threshold.

3. A laser system as recited in claim 2, wherein the voltage signal output from the time sensing circuit is utilized by the control circuit to determine the control signal supplied to the position controller.

4. A laser system as recited in claim 3, further including a hill climbing circuit which receives the voltage signal output from the time sensing circuit and determines the control signal supplied to the position controller.

5. A laser system as recited in claim 4, wherein position controller is provided with a dithering signal for dithering the position of said one mirror.

6. A laser system as recited in claim 1, wherein position controller is provided with a dithering signal for dithering the position of said one mirror.

7. A laser system as recited in claim 6, wherein the control circuit includes a hill climbing circuit which receives the output of the detector and determines the control signal supplied to the position controller.

8. A laser system as recited in claim 1, wherein said laser is a carbon dioxide laser.

9. A laser system as recited in claim 8, wherein the Q-switch is operated with a repetition rate in excess of 100 KHz.

10. A laser system as recited in claim 1, wherein the local oscillator includes a feedback circuit for locking the output frequency of the reference beam.

11. A laser system as recited in claim 1, wherein the local oscillator includes a grating for selecting a particular output frequency of the reference beam.

12. A laser system as recited in claim 1, wherein said laser is Q-switched and cavity dumped.

13. A laser system comprising:

a $CO_2$ local oscillator generating a reference laser beam at a fixed output frequency;

a $CO_2$ laser including a resonant cavity defined by at least two mirrors and wherein one of the mirrors is coupled to a position controller for adjusting the position of said one mirror to control the length of the cavity, said laser including a Q-switch which is repeatedly activated to change the cavity between a high loss and a low loss state causing pulses of laser radiation to be generated;

optics for directing the reference laser beam into the resonant cavity of the laser;

a detector for monitoring intensity of the pulses generated by the laser; and a control circuit receiving the output from the detector, said control circuit including a cavity build up time sensing circuit, said time sensing circuit generating an increasing voltage ramp and a voltage signal output corresponding to a point on the voltage ramp when the intensity of the pulse measured by the detector crosses a predetermined threshold, said control circuit further including a hill climbing circuit which receives the voltage signal output from the time sensing circuit, said hill climbing circuit generating a control signal based on voltage signal output and including a dither signal, said control signal being supplied to said position controller to drive said one mirror to a position which minimizes the time when the monitored intensity of the pulse crosses said predetermined threshold to lock the output frequency of the laser to the frequency of the local oscillator.

14. A laser as recited in claim 13, wherein the Q-switch is operated with a repetition rate in excess of 100 KHz.

15. A laser system as recited in claim 13, wherein the local oscillator includes a feedback circuit for locking the output frequency of the reference beam.

16. A laser system as recited in claim 13, wherein the local oscillator includes a grating for selecting a particular output frequency of the reference beam.

17. A laser system as recited in claim 13, wherein said laser is Q-switched and cavity dumped.

18. A laser system comprising:

a $CO_2$ local oscillator generating a reference laser beam, said the local oscillator including a feedback circuit for locking the output frequency of the reference laser beam, said local oscillator further including a grating for selecting a particular output frequency;

a $CO_2$ laser including a resonant cavity defined by at least two mirrors and wherein one of the mirrors is coupled to a position controller for adjusting the position of said one mirror to control the length of the cavity, said laser including a Q-switch which is repeatedly activated to change the cavity between a high loss and a low loss state causing pulses of laser radiation to be generated, said Q-switch being operated with a frequency of at least 100 KHz;

optics for directing the reference laser beam into the resonant cavity of the laser;

a detector for monitoring intensity of the pulses generated by the laser; and a control circuit receiving the output from the detector, said control circuit including a cavity build up time sensing circuit, said time sensing circuit generating an increasing voltage ramp and a voltage signal output corresponding to a point on the voltage ramp when the intensity of the pulse measured by the detector crosses a predetermined threshold, said control circuit further including a hill climbing circuit which receives the voltage signal output from the time sensing circuit, said hill climbing circuit generating a control signal based on voltage signal output and including a dither signal, said control signal being supplied to said position controller to drive said one mirror to a position which minimizes the time when the monitored intensity of the pulse crosses said predetermined threshold to lock the output frequency of the laser to the frequency of the local oscillator.

19. A laser system as recited in claim 18, wherein said laser is Q-switched and cavity dumped.

* * * * *